United States Patent [19]
Weber et al.

[11] 3,766,368

[45] Oct. 16, 1973

[54] PREDETERMINED PROCESSING LENGTH IN A NUMERICALLY CONTROLLED MACHINE TOOL

[75] Inventors: Fritz Weber, Erlangen; Peter Schiewek, Eltersdorf; Dieter Kremper, Erlangen, all of Germany

[73] Assignee: Siemens Aktiengesellschaft, Berlin, Germany

[22] Filed: Oct. 21, 1971

[21] Appl. No.: 191,161

[52] U.S. Cl............ 235/151.11, 318/696, 318/685, 235/92 MP, 235/92 DM, 235/92 CA, 90/24 R
[51] Int. Cl. ........................................... G05b 19/40
[58] Field of Search ................ 235/151.11, 151.11 I, 235/152, 92 MP, 92 CT, 92 CC, 92 CP; 90/24 R; 318/696, 685

[56] References Cited
UNITED STATES PATENTS
2,817,775   12/1957   Rosenberg et al............. 235/151.11

Primary Examiner—Eugene G. Botz
Attorney—Arthur E. Wilfond et al.

[57] ABSTRACT

A device for nibble and planing machines for the automatic division of a predetermined processing length in a numerically controlled machine tool wherein the standard step is predetermined from the outside and is not permitted to fall short of a specific value determined by technical requirements comprises a comparison device. A difference circuit supplies a signal representing the remaining processing length $(s - x)$ to the comparison device. A step length counter supplies a signal representing the step length to the comparison device. The comparison device produces an output signal for reducing the step length to divide the remaining processing length into p steps of substantially equal length when the comparison result indicates that the remaining processing length is shorter than p times a longer standard step $(\Delta s)$.

5 Claims, 2 Drawing Figures

PREDETERMINED PROCESSING LENGTH IN A NUMERICALLY CONTROLLED MACHINE TOOL

The invention relates to a device for the automatic division of a predetermined processing length or distance in a numerically controlled machine tool. More particularly, the invention relates to a device for the automatic division of a predetermined processing distance in a numerically controlled machine tool wherein a standard step assumed from the outside is not permitted to fall short of a specific value determined by technical requirements. The device is particularly intended for nibble machines.

When a numerical control is included in nibble machines which are used, for example, to punch out switchboards, control boards, control panels, and the like, the portion of a contour to be processed is programmed in a set of perforated strips. The entire distance or length is then divided into equal parts and punching is effected after the start of each step.

The component part to be worked on, that is, the length of the step, results from the programmed travel speed of the tool or the workpiece and the time for the control pulses to travel from the control to the drive of the machine tool. The release of the control pulses, which are normally produced by an interpolator, is usually effected via an electronic end switch which releases the interpolator for as long as the tool of the machine is in the range of the upper dead-center position.

The release time together with the programmed speed result in the travelled distance from stroke to stroke, that is, the step of the machine. During the "nibbling" of various lengths or distances it is almost inevitable, when constant step lengths are required, that a remnant of the length will remain at the end of each interpolator section and, under certain circumstances, may be so short that the tool may give way or turn aside during "nibbling" toward the preceding punch hole. As a result, the tool may break.

A similar problem of section division also occurs in planing machines where care must be taken that the last chip or shaving to be planed does not fall short of a specific thickness.

The same problem may have to be faced in a machine tool with adaptive regulation. For technical reasons such as, for example, cutting speeds, it is necessary, with respect to turning and milling machines, for example, that a minimal chip be removed during the last processing passage.

It is an object of the present invention to so vary the step length in machine tools of the aforedescribed type, that particularly the last step will not fall short of a value determined by technological requirements.

To accomplish this, and in accordance with the invention, the device for the automatic division of a predetermined length in a numerically controlled machine tool comprises a comparison device whose output signal subdivides the remaining processing length or distance into p steps of almost equal length if the remaining processing length or distance is shorter than $p$ steps of the longer standard or normal step. Normally, it would suffice to provide the shortening of the steps for the last four or five steps.

The device may be so constructed that the remaining processing distance is transferred, following each step, from a processing distance datum and pilot difference counter to a register. The zero signal of the counter indicates the end of the processing distance. The indication of the register and the indication of a step length counter are supplied to the comparison device. The transfer of the respective remnant processing distance to the register is then omitted from the time the step length is shortened.

In accordance with the invention, a device for nibble and planning machines for the automatic division of a predetermined processing length in a numerically controlled machine tool wherein the standard step is predetermined from the outside and is not permitted to fall short of a specific value determined by technical requirements, comprises comparison means. Difference means supplies a signal representing the remaining processing length $(s - x)$ to the comparison means. Step length means supplies a signal representing the step length to the comparison means. The comparison means produces an output signal for reducing the step length to divide the remaining processing length $(s - x)$ into p steps of substantially equal length when the comparison means provides a comparison result which indicates that the remaining processing length $(s - x)$ is shorter than p times a longer standard step $(\Delta s)$.

The comparison means produces an output signal when the comparison result indicates that the remaining processing length $(s - x)$ is shorter than four standard steps.

The difference means comprises a processing length datum-pilot difference counter producing a zero signal at the end of the processing length and a register connected to the comparison means. The difference counter transfers a signal indicating the remaining processing length to the register after each step. The step length means comprises a step length counter connected to the comparison means. The difference counter comprises a reverse counter. The dividing means includes means for preventing the transfer of a signal from the difference counter to the register of the difference means when the step length is shortened.

In order that the invention may be readily carried into effect, it will now be described with reference to the accompanying drawing, wherein.

Figure 1:
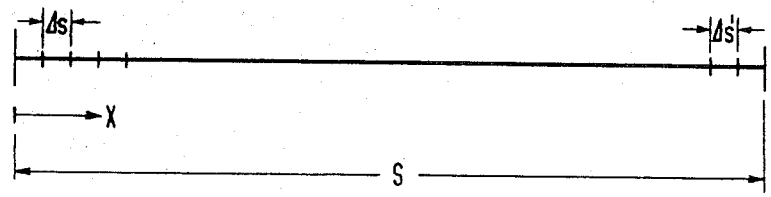
FIG. 1 is a schematic diagram for explaining the division of the length.

FIG. 1 shows a length or distance $s$. The normal or standard step length $\Delta s$ is fixed from the outside by the nibble machine. The circuit of the invention, as shown in FIG. 2, varies several of the last step lengths, so that the last step in the X direction cannot fall below a predetermined value.

Figure 2:
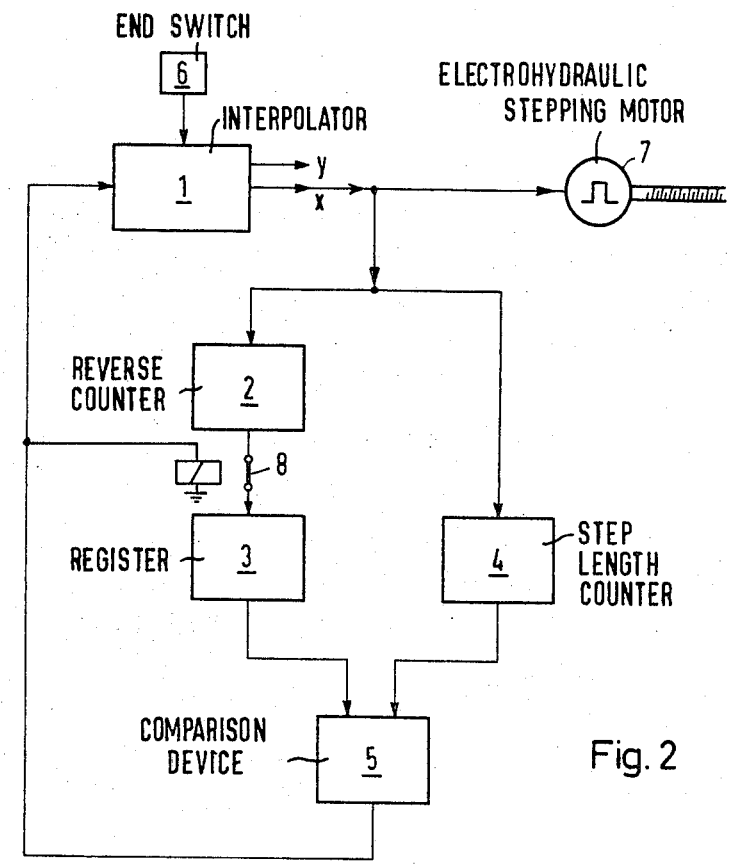
FIG. 2 is a block diagram of an embodiment of the device of the invention for the automatic division of a predetermined processing length in a numerically controlled machine tool.

In FIG. 2, an end switch 6 is located in the stroke path of a numerically controlled machine (not shown in FIG. 2). The end switch 6 releases an interpolator 1. The interpolator 1 delivers for each step in the X direction a specific number of pulses to an electrohydraulic stepping motor 7. The motor 7 effects the feeding of the tool (not shown in FIG. 2) in the X direction.

At the same time, the interpolator 1 feeds the pulses to a digital processing distance datum and pilot difference or reverse counter 2. The counter 2 is preadjusted, at the start of the processing length or distance, to the entire length $s$. At the end of each count, the indication $s - n\Delta s$ of the counter 2 is transferred to a register 3 via a switch 8. In the counter 2 indication $s - n\Delta s$, n is the number of steps already travelled.

The interpolator 1 also simultaneously supples pulses to a counter 4, which determines the respective step length $\Delta s$.

After each tool or punch stroke, the indication of the register 3 is compared with the predetermined step length $\Delta s$ in the comparison device 5. If, towards the end of the procesing length or distance, the indication $s - n\Delta s$ of the register 3 is lower than a predetermined number $p$ times the indication of the step length counter 4, the comparison device 5 produces a command signal to shorten the length of the steps. The indications of the register 3 and step length counter 4 are derived with simplicity by deriving the signals at specific stages of said register and said counter.

To shorten the length of the steps, as command by the comparison device 5, the switch 8 blocks, for the next step, the transfer of the indication of the reverse counter 2 to the register 3. This may be accomplished by any suitable means such as, for example, a relay winding 9 connected to the output of the comparison device 5 and operating the switch 8. During the next-succeeding step, the interpolator 1 delivers pulses to the stepping motor 7 and the step length counter 4, starting from zero, until $p$ times the indication of said counter is higher than the remnant value of the register 3, which remains constant. Thereupon, the interpolator 1 is blocked by a signal from the comparison member 5. This procedure continues until the end of the procesing.

As a result of the aforedescribed operation, the entire remaining or remnant length or distance $s - n\Delta s$ is subdivided into $p$ parts. During the last step, a length $$\Delta s' = (s - n\Delta s)/p$$

is travelled per step.

If the result is not a whole number, this will only mean that the last step will be shorter by some percent than the preceding steps, if the counter 2 reaches an indication of zero, but will, in any event, still be completely within the tolerable range.

This may be illustrated by a simple example. It is assumed that the standard step $\Delta s = 40$ pulses $= 4$ mm, the predetermined number of steps is $p = 4$, and the remaining processing length or distance $s - n\Delta s = 161$ pulses. The comparison shows that 161 is greater than 4 times 40, or 160, that is, the standard step can still be carried out. After the standard step, the new indication of the register 3 is 121 pulses. If the step length counter 4 is again timed, the result at its position $\Delta s' = 31$ shows that 4 times $31 = 124$ is greater than 121, which is the indication of the register 3. Accordingly, the output signal of the comparison device 5 blocks the interpolator 1. Hence, 31 pulses correspond to the new step $\Delta s'$.

The output signal of the comparison device 5 opens the switch 8. During the next step, the comparison shows that when the count indication of the step length counter 4 is 31, 4 times 31 is 124, which is greater than 121. Thus, the new step length $\Delta s'$ is also 31. This is followed by a step $\Delta s'$ with 31 pulses and a last step $\Delta s'$ with 28 pulses, until the pilot value counter 2 issues a zero signal. This then concludes the entire processing length or distance.

The aforedescribed device or circuit of the invention thus divides the remnant of 121 pulses into approximately four equal parts.

While the invention has been described by means of a specific example and in a specific embodiment, we do not wish to be limited thereto, for obvious modifications will occur to those skilled in the art without departing from the spirit and scope of the invention.

We claim:

1. A device for nibble and planing machines for the automatic division of a predetermined processing length in a numberically controlled machine tool wherein the standard step is predetermined from the outside and is not permitted to fall short of a specific value determined by technical requirements, said device comprising comparison means; difference means for supplying a signal representing the remaining processing length $(s - x)$ to the comparison means; step length means for supplying a signal representing the step length to the comparison means, said comparison means producing an output signal for reducing the step length to divide the remaining processing length $(s - x)$ into $p$ steps of substantially equal length when said comparison means provides a comparison result which indicates that the remaining pocessing length $(s - x)$ is shorter than p times a longer standard step $(\Delta s)$.

2. A device as claimed in claim 1, wherein the comparison means produces an output signal when the comparison result indicates that the remaining processing length $(s - x)$ is shorter than four standard steps.

3. A device as claimed in claim 1, wherein the difference means comprises a processing length datum-pilot difference counter producing a zero signal at the end of the processing length and a register connected to the comparison means, said difference counter transferring a signal indicating the remaining processing length to the register after each step, and the step length means comprises a step length counter connected to the comparison means.

4. A device as claimed in claim 3, wherein the difference counter comprises a reverse counter.

5. A device as claimed in claim 3, wherein the dividing means includes means for preventing the transfer of a signal from the difference counter to the register of the difference means when the step length is shortened.

* * * * *

PO-1050
(5/69)

UNITED STATES PATENT OFFICE
CERTIFICATE OF CORRECTION

Patent No. 3,766,368    Dated  October 16, 1973

Inventor(s) FRITZ WEBER ET AL

It is certified that error appears in the above-identified patent and that said Letters Patent are hereby corrected as shown below:

In the heading to the printed specification, there should be included:

--Foreign Application Priority Data

October 28, 1970    Germany............P 20 52 757.5--

Signed and sealed this 16th day of April 1974.

(SEAL)
Attest:

EDWARD M.FLETCHER,JR.               C. MARSHALL DANN
Attesting Officer                  Commissioner of Patents